June 21, 1927.
J. R. HOUTS
SCRAPER EDGE TURNER
Filed March 26, 1926
1,633,329
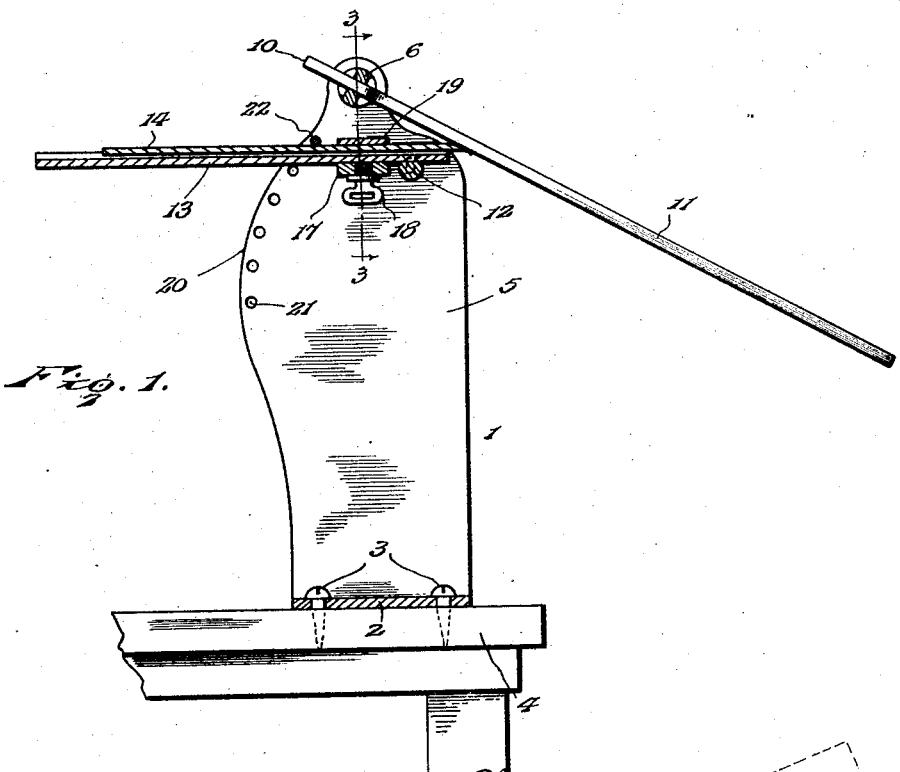
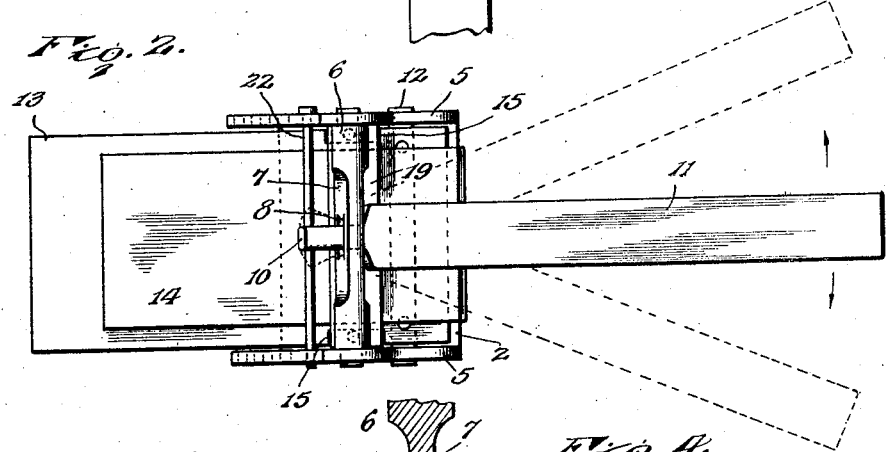
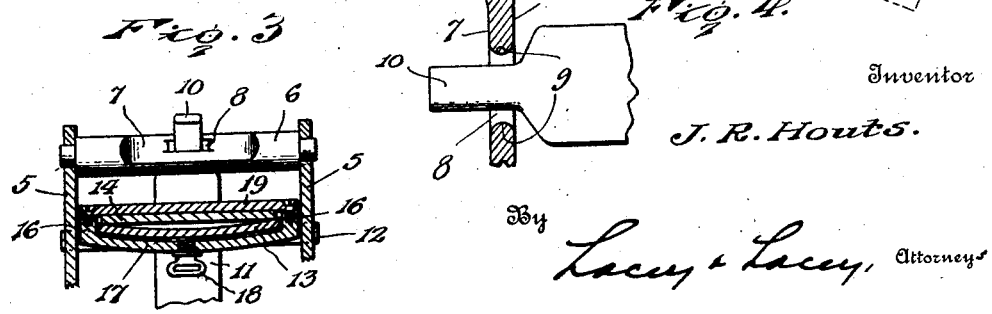
Inventor
J. R. Houts.
By Lacey & Lacey, Attorneys Patented June 21, 1927.

1,633,329

UNITED STATES PATENT OFFICE.

JOHN R. HOUTS, OF McLEAN, VIRGINIA.

SCRAPER-EDGE TURNER.

Application filed March 26, 1926. Serial No. 97,689.

This invention has for its object the provision of a simple and easily manipulated tool whereby the edges of scraper blades may be efficiently turned, the tool being intended primarily for use in maintaining an efficient edge upon the blades used in scraping floors. In scraping floors and similar surfaces, it is essential that the edge of the scraper blade be turned in order to properly bite into or grip the floor material, it being common experience that a scraper blade which has a sharp cutting edge and would ordinarily cut into and through material to which it is applied will merely slip over a floor, especially a hardwood floor, and in order to obtain the desired results it is necessary that the working edge be slightly deflected so as to present a turned cutting edge to the floor surface in order to obtain the necessary bite or grip upon the same. My invention provides an inexpensive means whereby the edge of the scraper blade may be turned rapidly and as often as necessary in a convenient manner. One form of the invention is illustrated in the accompanying drawing, and the invention resides in certain novel features which will be hereinafter first fully described and then more particularly pointed out in the appended claims.

In the drawing:

Figure 1 is a vertical longitudinal section of a device embodying the invention, showing the same arranged for use;

Fig. 2 is a top plan view of the same;

Fig. 3 is a detail section on the line 3—3 of Fig. 1;

Fig. 4 is an enlarged detail section particularly showing the manner in which the turning instrument is supported.

In carrying out the invention, I provide a frame 1 which consists essentially of a base 2 adapted to be secured by screws 3 or the like upon a fixed support, such as a workbench 4, and side plates or standards 5 rising from the base. The side plates or standards may conveniently be formed integral with the base member 2 so that the entire frame may be formed from sheet material of sufficient strength. Mounted in and extending between the upper extremities of the side plates 5 is a rock shaft 6, the intermediate portion of which is flattened at diametrically opposite sides, as shown at 7, and through the said flattened portion is formed a longitudinal slot 8 having its end walls convex, as shown at 9. The slot 8 receives the reduced tongue or tenon 10 at the end of the edge turning implement 11, as clearly shown in the drawings. This turning implement 11 is a flat bar having smooth faces, and is very similar in outline to a file or rasp but, unlike a file or rasp, its opposite faces are smooth. Below the rock shaft 6 and in advance of the vertical plane of said shaft a pivot 12 is mounted in the side plates 5 and extends between the same. To this pivot is secured the front end of a clamping plate or holder 13 which extends slightly forward of the pivot and rearwardly therefrom beyond the supporting frame. As shown most clearly in Fig. 3, the holder or clamping plate 13 is dished or curved transversely so that, when pressure is applied thereto, it will tend to flatten and thereby bite into the opposed face of the scraper blade 14 and, consequently, very effectually secure the blade against displacement while being acted upon by the edge turning implement 11. The blade is a flat plate of tool steel, and, when it is to be treated, is placed upon the holder or clamping plate 13, as illustrated in the drawing. At a point in rear of the pivot 12, the side edges of the holder or clamping plate 13 are formed with notches, indicated at 15, to receive the lugs 16 or upturned ends of a bridle or clamping member 17 which is disposed transversely below the holder 13 and carries a thumb screw 18 which is adapted to be turned home against the holder 13, as will be understood upon reference to the drawing. Secured to the lugs or upturned ends 16 is a cross bar 19 which extends across the blade and the holder and bears directly against the upper face of the blade, the pressure exerted by the set screw 18 being received by this upper cross bar so that the holder 13 will be securely clamped against the blade and the latter, in turn, clamped against the cross bar, the result being that the blade is very securely held and cannot be accidentally displaced. The rear edges of the side plates 5 are arcuate in their upper portions, as shown at 20, and along these arcuate portions I provide a series of openings 21 through which may be selectively inserted a stop pin 22, the pin being disposed above the blade 14 and limiting the upward movement of the rear portion of the blade and the holder so that the tool 11 may be disposed in a desired angular relation to the edge of the blade and thereby turn the same in the degree desired.

It is thought the manner of using the device will be readily understood from the foregoing description, taken in connection with the accompanying drawing. The blade is clamped in the holder in the manner described and shown and the pin 22 inserted through the proper openings 21 so as to resist the upward movement of the rear portion of the holder and the blade. The tenon 10 of the edge-turning bar or tool 11 is engaged loosely in the slot 8 of the rock shaft 6, and it will be noted that the working edge of the blade will project toward the said tool or bar. The blade is, of course, secured in the holder in such position that the working edge will project beyond the front end of the holder, as shown clearly in Fig. 1. The workman will grasp the outer free end of the bar 11 and press downwardly upon the same so that it will bear upon the projecting working edge of the blade and thereby swing the same into the position shown in Fig. 1 against the stop pin 22. The bar 11 is rocked back and forth while in contact with the edge of the scraper and the pressure thereby exerted upon the edge of the scraper will slightly turn the same so that it will rapidly acquire the desired gripping form. The slot 11 is somewhat longer than the greater dimension of the tenon 10 so that the tenon may move freely in the slot and the convex end walls 9 of the slot permit the tenon to assume any necessary angular relation to the rock shaft. The bar is not attached to the rock shaft but is merely engaged therewith so that the pressure exerted upon the bar will hold it in proper contact with the scraper blade and it will not be necessary for the operator to employ both hands in order to effect such contact. Moreover, the contact of the bar upon the scraper blade is more uniform than if the turning tool was merely held manually thereto without any mechanical support. It will be noted that the holder and blade are eccentrically supported in the frame, the pivot 12 being close to the front end of the holder but a very considerable distance from the rear end thereof. Consequently, the tendency of the holder and the blade therein to swing to a vertical or substantially vertical position naturally establishes the proper contact between the scraper blade and the bar or tool 11 while the pressure exerted upon the scraper through the bar 11 will maintain it in the proper angular position determined by the placement of the stop pin 22, said stop preventing the pressure of the tool throwing the blade downwardly to a position where the tool cannot act on it. When the edge of the blade has been turned as desired, the workman simply withdraws the bar 11 from its engagement with the rock shaft 6, whereupon the holder and the blade will swing to a substantially vertical position below the pivot 12, thereby presenting the thumb screw 18 at the front so that it may be very easily reached and manipulated to release the blade in an obvious manner without reaching around the blade or under its support. My tool is obviously simple in the construction and arrangement of its parts and may be produced and installed at a very low cost. It will be found highly efficient in use and is not apt to get out of order or require frequent renewals or repairs.

Having thus described the invention, I claim:

1. An apparatus for the purpose set forth comprising a supporting frame, a blade holder mounted within the frame for free swinging movement from a vertical inoperative position to an operative position, a support for an edge-turning tool carried by said frame above the blade holder, and an edge-turning tool engaged in said support to bear upon a blade in the holder for rocking movement across the edge of the blade, and abutment means carried by said frame for adjustment vertically thereof and adapted to extend across the blade holder and limit movement thereof from a vertical position towards a horizontal position.

2. An apparatus for the purpose set forth comprising a supporting frame, a blade holder pivotally mounted near one end in said frame whereby it tends constantly to assume a vertical position, a rocking support mounted in the frame above the blade holder, an edge-turning tool loosely engageable with said support to bear upon a blade in the holder and rock back and forth transversely of the blade upon the edge of the same, the pressure of the tool on the blade swinging the rear end of the holder upwardly, and means adjustable vertically of the frame for extending across the blade holder and limiting the upward movement of the rear end of the blade and holder under the pressure exerted upon the cutting edge of the blade by the edge turning tool.

3. An apparatus for the purpose set forth comprising a supporting frame, including vertical standards spaced from each other, a pivot mounted in said frame between said standards, a blade holder secured near one end to said pivot and normally hanging vertically between the standards, means between the pivot and the opposite end of the blade holder for securing a blade to the holder, said means being adjustable into and out of position to secure the blade and having an actuating portion extending forwardly from the blade holder when the blade holder is in its vertical position, a rock shaft mounted in the frame above and at the rear of said pivot, said standards being provided with vertically spaced alined openings adjacent their rear edges, an abutment rod extending through selected openings of said standards and adapted to extend across the blade holder and limit its swinging movement from a vertical toward a horizontal position, and an edge-turning tool engageable in the rock shaft and arranged to bear upon the front edge of a blade secured to the holder when the holder is swung upwardly out of the vertical position.

In testimony whereof I affix my signature.

JOHN R. HOUTS. [L. S.]